United States Patent Office 2,741,658
Patented Apr. 10, 1956

2,741,658
ACID AMIDE DERIVATIVES OF AZO-DYESTUFFS

Max Schmid, Riehen, Eduard Moser, Basel, Jakob Danuser, Arlesheim, Rudolf Mory, Binningen, Willy Mueller, Riehen, and Jakob Wuergler, Neuewelt, near Basel, Switzerland, assignors to Ciba Limited, Basel, Switzerland, a Swiss firm No Drawing. Application October 19, 1953,
Serial No. 387,067

Claims priority, application Switzerland October 20, 1952

8 Claims. (Cl. 260—174)

The present application is a continuation-in-part of our co-pending application Serial No. 273,364 filed February 25, 1952.

The present invention provides new acid amide derivatives of azo-dyestuffs which are free from sulfonic acid groups and correspond to the general formula

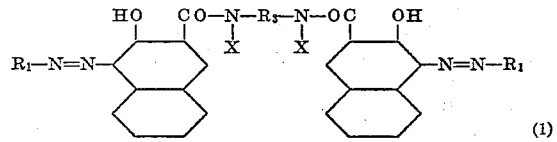

(1)

in which $R_1$ and $R_2$ each represent the radical of a diazo-component, X stands for hydrogen or an alkyl group of low molecular weight and

(2)

is the radical of a non-vattable diamine, at least one of the radical $R_1$ or $R_2$ containing a trifluoromethyl group.

These acid amide derivatives are advantageously prepared by condensing two molecular proportions of a halide of the formula

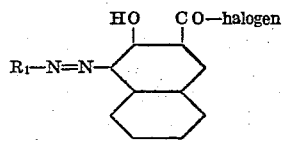

or one molecular proportion of two different halides of the formulae (3)
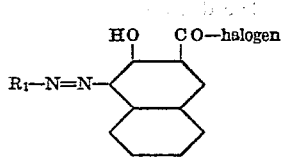

and

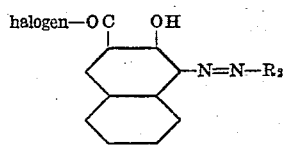

(4)

with 1 molecular proportion of a diamine of the formula (5)

The meanings of $R_1$, $R_2$, $R_3$ and X in Formulae 3 to 5 are the same as given in the first paragraph.

The acid halides can be obtained by treating the appropriate carboxylic acids with acid halogenizing agents. These carboxylic acids of the formulae (6)
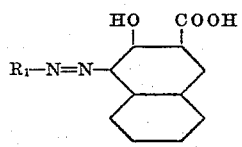

and

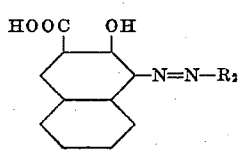

(7)

can in turn be prepared by methods in themselves known by coupling diazo compounds free from sulfonic acid groups with 2-hydroxynaphthalene-3-carboxylic acid, diazo components containing trifluoromethyl groups being used at least for the prepartion of the products of Formula 6.

The diazo-components can belong preferably to the benzene series. The following compounds may be mentioned as examples:

1-amino-2-chloro-5-trifluoromethyl-benzene,
1-amino-2-trifluoromethyl-4-chlorobenzene,
1-amino-3:5-di-(trifluoromethyl)-benzene,
1-amino-5-trifluoromethyl-benzene-2-ethyl-sulfone.

When according to the present invention the acid amide derivatives are of an asymmetrical constitution, i. e. are prepared by condensing a diamine of the Formula 5 with an acid halide of each of the Formulae 3 and 4, there may be used for the preparation of compounds of the Formula 7 yielding an acid halide of the Formula 4 also diazo-components free from trifluoromethyl groups, preferably those which are suitable for the preparation of ice-colors.

The azo-compounds of Formulae 6 and 7 containing carboxylic acid groups are treated with agents capable of forming acid halides. As such agents there are to be understood those which are capable of converting carboxylic acids into their acid halides, for example their bromides or chlorides: there are especially suitable as such agents phosphorus halides, phosphorus pentabromide or phosphorus trichloride, phosphorus pentachloride and phosphorus oxy-halides. It is of advantage to choose acid-chlorinating agents, i. e. those which serve for the preparation of the appropriate acid chlorides such as phosphorus pentachloride and thionyl chloride.

The treatment with such halogenating agents is advantageously carried out in an inert organic solvent, such as dimethylformamide, a chlorobenzene, for example, mono- or dichlorobenzene, toluene, xylene, benzene or nitrobenzene.

In preparing such acid halides it is generally of advantage first to dry the azo-compound produced in an aqueous medium or to free it from water by azeotropic distillation in an organic solvent. This azeotropic drying may, if desired, immediately precede the treatment with the halogenating agent.

As diamines of Formula 5 there are advantageously used those whose amino groups are both bound to aromatic carbon atoms, for example those in which $R_3$ represents an aromatic radical of the naphthalene or benzene series, in which the amino groups may be primary or, if desired, secondary. The diamines can be mononuclear, such as for example, 1:4-diaminobenzene, 1:4-diamino-2-chlorobenzene, 1:4-diamino-2:5-dialkoxybenzene or 1:4-diaminobenzenes, having in the 2- and 5-position various substituents such as nitro-, halogen atoms, alkoxy groups, alkyl groups.

As a rule particularly valuable results are obtained when di- and polynuclear amines are used, as, for instance, when 4:4'-diamino-diphenyl and its derivatives such as for example 3:3'-dichloro-, 3:3'-dimethyl-, 3:3'-dialkoxy-4:4'-diamino-diphenyl, 3:5:3':5'-tetrachloro-4:4'-diamino-diphenyl and 3:5:3':5'-tetramethyl-4:4'-diamino-diphenyl. In many cases valuable dyestuffs are also obtained by using diamines of the benzene series in which two identical or different benzene nuclei are linked together by a suitable bridge member, for example, by oxygen, or an —SO₂— group, as in the case for example of 4:4'-diamino-diphenyl-sulfone, 3:3'-diamino-4:4'-dichloro-diphenyl-sulfone, 3:3'-diamino-4:4'-dimethoxy-diphenyl-sulfone, or a —CO— group such as for example 3:3'-diamino-diphenyl-ketone, 3:3'-diamino-4:4'-dichloro-diphenyl-ketone, 3:3'-diamino-4:4'-dimethoxy-diphenyl-ketone, or a —CH₂— group such as for example 3:3'-diamino-diphenyl-methane, 3:3'-diamino-4:4'-dichloro-diphenyl-methane, 4:4'-diamino-3:3'-dichloro-diphenyl-methane, 4:4'-diamino-3:5:3':5'-tetrachloro-diphenyl-methane, or the groups —NHCO—, —NHCONH—,

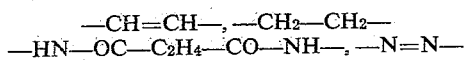

Finally there come into consideration diamines of quite a different kind, for example, 2:8-diamino-chrysene, 4:11-diamino-fluoroanthene, 2:6- or 1:5-diamino-naphthalene.

In addition diamines with secondary amino groups can also be used, advantageously di-(N-alkylamino)-aryl compounds such as 4:4'-di-(methylamino)-diphenyl or 4:4'-di-(methylamino)-diphenyl-sulfone.

The condensation of the carboxylic acid halides described above with the diamines is advantageously carried out in an anhydrous medium. Under these conditions the condensation generally proceeds surprisingly easily even at temperatures within the range of the boiling points of normal organic solvents such as toluene, monochlorobenzene, dichlorobenzene, trichlorobenzene, nitrobenzene and the like. In order to accelerate the reaction it is generally desirable to remove the hydrochloric acid obtained during condensation, for example by continuous distillation, boiling under reflux or by adding an acid-binding agent such as anhydrous sodium acetate, pyridine or anhydrous ammonia. The dyestuffs so obtained are in part crystalline and in part amorphous, and are generally obtained in very good yield and in pure state. It may be of advantage, in order to produce especially pure dyestuffs, first to isolate the acid chlorides obtained from the carboxylic acids, and if desired, to recrystallize the acid chlorides. In some cases, however, the isolation of the acid chloride may be dispensed with without any harmful effects, and in some cases with an improvement even in the result, and the condensation carried out immediately following the preparation of the acid chloride. If asymmetrical acid amide derivatives are to be prepared, the condensation of the diamine may be carried out with the two different acid halides in two steps or in a single step.

The new acid amide derivatives of azo-dyestuffs according to Formula 1 are pigments and as a rule are distinguished by an especially good fastness to migration and also by their temperature resistance and fastness to solvents. These properties are valuable above all for so-called pigment-printing, that is to say, printing processes which depend on fixing pigments by means of suitable adhesives, such as casein, hardenable plastics, especially urea or melamine-formaldehyde condensation products, polyvinyl chloride or polyvinyl acetate solutions or emulsions or other emulsions (for example oil-in-water or water-in-oil emulsions) on a substratum, especially on textile fibers but also on other flat shaped structures such as paper (for example wall-papers) or fabrics made of glass fibers. The pigments can also be used for other purposes, for example, in a finely dispersed form for dyeing artificial silk made of viscose or cellulose ethers or esters or superpolyamides or superpolyurethanes in the spinning solution, and also serve well in the manufacture of colored lakes or lake formers, solutions and products made of acetyl cellulose, nitro-cellulose, natural resins such as polymerization or condensation resins, for example, aminoplasts, phenoplasts, polystyrene, polyethylene, polyacryl, rubber, casein, silicones and silicone resins. They can also be used with advantage in the manufacture of colored pencils, cosmetic preparations and laminated plates.

By virtue of the especially favorable physical form in which the products of the invention are generally obtained, and owing to their chemical inertness and good temperature resistance, they can usually be dispersed easily in masses or preparations of the aforesaid kind, and advantageously at a stage at which these masses or preparations have not yet reached their final shape. The operations necessary for shaping, such as spinning, pressing, hardening, casting, sticking, can then be carried out without difficulty in the presence of the pigments of this invention, without any chemical reactions of the substratum such as further polymerizations, condensations, etc. being inhibited.

The following examples illustrate the invention, without limiting its scope in any way. The parts and percentages are by weight unless otherwise stated.

*Example 1*

78.9 parts of the dyestuff from diazotized 1-amino-2-chloro-5-trifluoromethyl-benzene and 2-hydroxy-naphthalene-3-carboxylic acid are suspended in 800 parts by volume of dry toluene; 28.6 parts of thionyl chloride are added and the whole is slowly heated to the boiling point of the solvent. As soon as the whole has completely dissolved, the reaction mixture is maintained for a short time at a gentle boil. After cooling, the whole is filtered with suction and washed with toluene. The orange colored crystals of the acid chloride melt at 216 to 217° C. (uncorrected).

41.3 parts of the acid chloride are dissolved hot in 500 parts by volume of anhydrous toluene. A solution of 5.4 parts of 1:4-diamino-benzene in 50 parts by volume of dry pyridine is added and the whole is maintained at a gentle boil while stirring for 15 hours. The pigment formed is filtered with suction while hot and washed thoroughly with hot toluene and then dried in vacuo at 60 to 65° C. The dyestuff of the formula

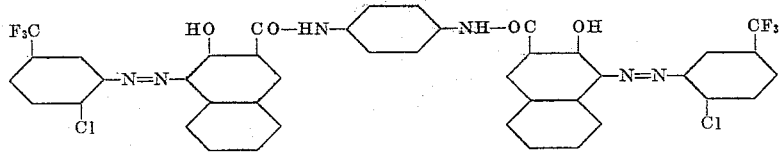

is an orange colored powder. It colors polyvinyl chloride and other plastics brilliant red-orange tints with good fastness properties.

By using, instead of 1:4-diamino-benzene, 1:4-diamino-2-chlorobenzene in the condensation there is obtained a somewhat redder orange coloration in the polyvinyl chloride with very good fastness properties. With 4:4'-diamino-diphenyl-sulfone there is obtained a yellow orange color, with 4:4'-diamino-1:1'-diphenyl urea a red orange and with 4:4'-diamino-2-methoxy-5-methyl-1:1' azobenzene a scarlet color.

*Example 2*

39.45 parts of the dyestuff from diazotized 1-amino-2-chloro-5-trifluoromethyl-benzene and 2-hydroxy-naphthalene-3-carboxylic acid are stirred well in 280 parts by volume of anhydrous chlorobenzene, and 14.3 parts of thionyl chloride are added. The whole is slowly heated to the boiling point of the solvent and maintained at the boil for about half an hour. 12.6 parts of 3:3'-dichloro-4:4'-diamino-diphenyl dissolved in 50 parts by volume of warm chlorobenzene and 10 parts by volume of pyridine are added to the solution. The reaction mixture is maintained at the boil for 20 hours, is filtered off while hot and washed with hot chlorobenzene until the washings are almost colorless. The dyestuff is dried at 65° C. in vacuo. It colors polyvinyl chloride reddish orange tints which have an excellent fastness to migration and very good fastness to light. The pigment is very suitable for pigment-printing and for dyeing acetate silk in the spinning solution.

If instead of 3:3'-dichloro-4:4'-diamino-diphenyl, other diamines are used in the condensation, for example 4:4'-diamino-diphenyl, 3:3'-dimethyl-4:4'-diamino-diphenyl, 1:5-diamino-naphthalene, 4:4'-diamino-diphenyl-methane, there are obtained dyestuffs of a similar shade with very good fastness properties, especially in various plastics.

*Example 3*

85.6 parts of the dyestuff from diazotized 1-amino-3:5-di-(trifluoromethyl)-benzene and 2-hydroxy-naphthalene-3-carboxylic acid are stirred in 500 parts by volume of anhydrous toluene; 28.6 parts of thionyl chloride are added and the whole heated to the boil. After complete dissolution, the whole is maintained at the boil for a further half hour, any impurities filtered off hot, and the filtrate allowed to stand for some time. The crystals formed in the filtrate are filtered off and washed by suction filtering and then dried at 45° C. in vacuo. The acid chloride crystallizes in the form of long needles.

44.65 parts of the acid chloride are dissolved hot in 500 parts by volume of dry toluene. 10.6 parts of 3:3'-dimethyl-4:4'-diamino-diphenyl dissolved in 100 parts by volume of toluene and 30 parts by volume of dry pyridine are rapidly run into the solution. The formation of the dyestuff is completed by boiling for about 15 hours under reflux. The whole is filtered hot and the filtrate washed thoroughly with hot toluene. After drying there is obtained a finely crystalline dyestuff which colors plastics, for example polyvinyl chloride, orange tints having very good fastness properties.

When the above acid chloride is condensed in the same manner as described in this example with other diamines, for example, 1:4-diaminobenzene, 4:4'-diamino-diphenyl, 3:3'-dichloro-4:4'-diamino-diphenyl, 1:5-diamino-naphthalene, 3:3'-dichloro-4:4'-diamino-diphenyl-methane, or di-(3-amino-4-chlorobenzoyl)-α:β-diamino-ethane, there are obtained pigments of similar shades. With 4:4'-diamino-stilbene a brown pigment is obtained.

*Example 4*

47.0 parts of the acid chloride of the dyestuff from diazotized 1-amino-5-trifluoromethyl-phenyl-2-ethyl-sulfone and 2-hydroxy-napthalene-3-carboxylic acid which was obtained in the same manner as described in Example 1, is condensed in ortho-dichlorobenzene with 7.9 parts of 1:5-diamino-naphthalene. Condensation is carried out in the same way as described in Example 1. A brilliant yellow orange is obtained which colors plastics, especially polyvinyl chloride foils, with good fastness properties. A similar dyestuff is obtained when 3:3'-dimethyl-4:4'-diamino-diphenyl is used instead of 1:5-diamino-napthalene.

*Example 5*

The dyestuff from diazotized 1-amino-2-trifluoromethyl-4-chlorobenzene and 2-hydroxy-napthalene-3-carboxylic acid is reacted with thionyl chloride in anhydrous toluene. Brilliant red colored crystals melting at 189 to 190° C. (uncorrected) are obtained.

When reacting this acid chloride with 4:4'-diamino-diphenyl in the way described in Example 3, a dyestuff is obtained in the form of a brownish powder which dissolves brilliant red in sulfuric acid. Polyvinyl chloride is colored scarlet and the dyeings have a very good fastness to migration. A similarly fast dyestuff is obtained by using 1:4-diamino-benzene instead of 4:4'-diamino-diphenyl. With 2:2'-diamino-4:4'-dichloro-diphenyl sulfide an orange tint is obtained, and with the diamine of the formula

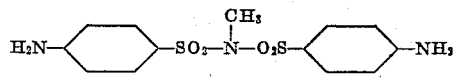

a scarlet shade.

What is claimed is:

1. An acid amide derivative of an azo dyestuff, which derivative is free from sulfonic acid groups and corresponds to the formula

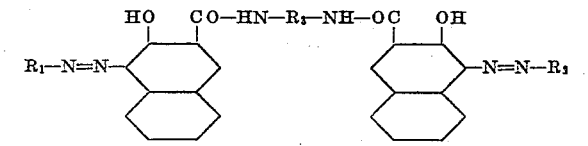

in which R₁ and R₂ each represent the radical of a diazo-component of the benzene series, at least one of these radicals containing a trifluoromethyl group, and R₃ represents the radical of a non-vattable aromatic carbocyclic compound.

2. An acid amide derivative of an azo dyestuff, which derivative is free from sulfonic acid groups and corresponds to the formula

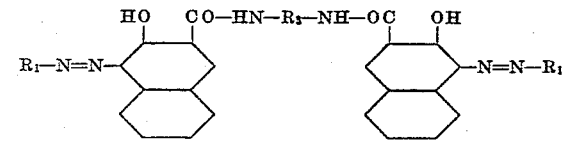

in which R₁ represents an aromatic radical of the benzene series containing at least one trifluoromethyl group and —HN—R₃—NH— represents the radical of a non-vattable aromatic carbocyclic diamine, each of the —HN—groups being bound to an aromatic carbon atom of R₃.

3. An acid amide derivative of an azo dyestuff, which derivative is free from sulfonic acid groups and corresponds to the formula

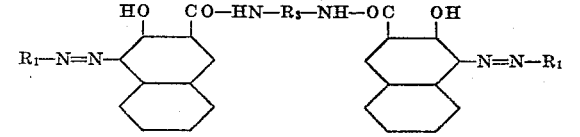

in which R₁ represents an aromatic radical of the benzene series containing at least one trifluoromethyl group, and R₃ represents a member selected from the group consisting of a benzene radical and a diphenyl radical.

4. The acid amide derivative of the formula

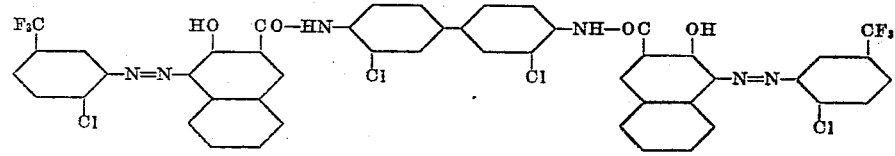

5. The acid amide derivative of the formula
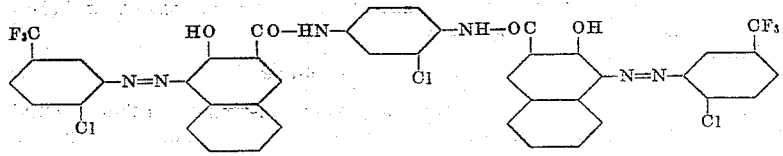
6. The acid amide derivative of the formula
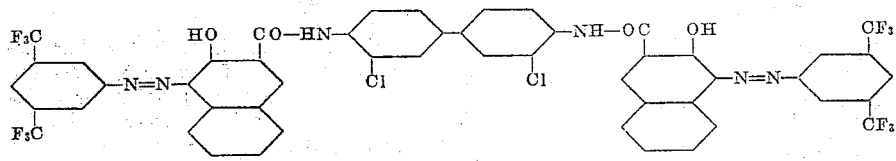
7. The acid amide derivative of the formula
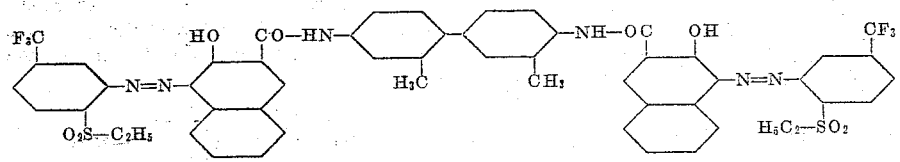
8. The acid amide derivative of the formula
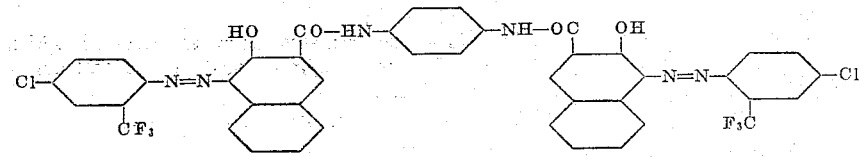
No references cited.